July 17, 1962
L. BODDY
3,044,296
TEMPERATURE INDICATING SYSTEM
Original Filed Aug. 5, 1949
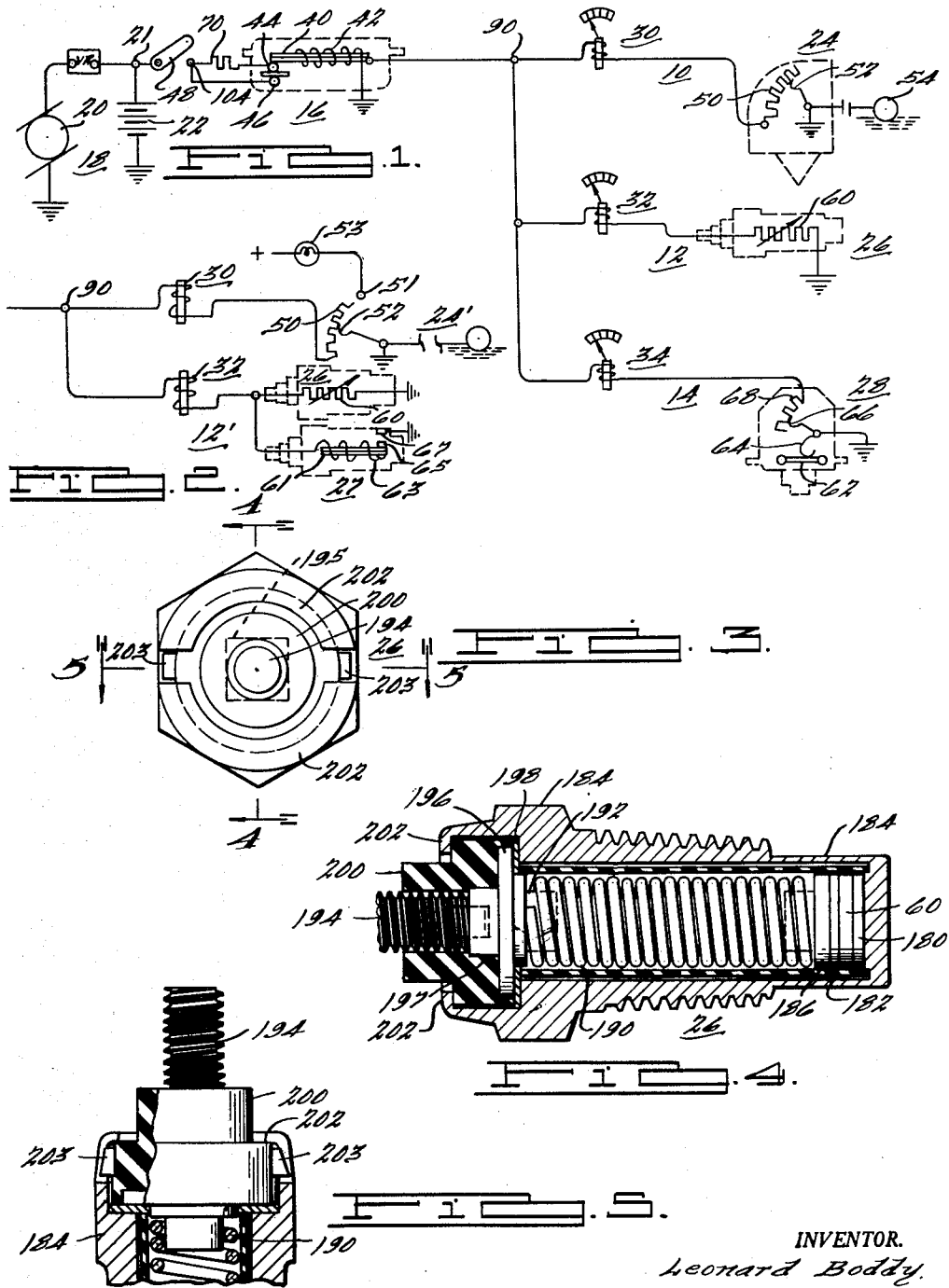
INVENTOR.
Leonard Boddy.
BY
Harness, Dickey & Pierce
ATTORNEYS United States Patent Office 3,044,296
Patented July 17, 1962

3,044,296
TEMPERATURE INDICATING SYSTEM
Leonard Boddy, Ann Arbor, Mich., assignor to King-Seeley Thermos Co., a corporation of Michigan
Application Dec. 20, 1954, Ser. No. 476,505, which is a division of application Ser. No. 108,773, Aug. 5, 1949, now Patent No. 2,835,885, dated May 20, 1958. Divided and this application May 28, 1959, Ser. No. 817,021
13 Claims. (Cl. 73—342)

This invention relates to temperature indicating systems.

An object of this invention is to improve the performance, enhance the stability of operation and yet to simplify the manufacture of temperature measuring systems.

Another object of this invention is to concurrently gauge the temperature of one body portion and sense the temperature of another body portion.

Another feature of this invention is the associating with a single gauging device of a pair of diverse temperature sensing devices.

Another feature of this invention is a means for varying the indication produced by a gauge as a result of temperature variations coupled with another means for controlling the gauge only upon the sensing of a preselected temperature level.

The manner of accomplishment of the foregoing objects, the nature of the foregoing features, and other objects and features of the invention, may be perceived from the following detailed description of an embodiment of the invention when read with reference to the accompanying drawings in which:

FIGURE 1 is a diagrammatic view of a gauging system with which the current modulating device constituting this invention may be embodied;

FIG. 2 is a diagrammatic representation of a temperature sensitive gauging system associable with a portion of the system of FIG. 1, embodying certain of the principles of the invention;

FIG. 3 is a view in top plan of a temperature sensitive device embodying certain other of the principles of the invention and adapted for use as an element of the system shown in FIGS. 1 and 2;

FIG. 4 is a sectional view taken substantially along the line 4—4 fo FIG. 3; and FIG. 5 is a fragmentary sectional view taken substantially along the line 5—5 of FIG. 3.

This application is a division of my application Serial No. 476,505, filed December 20, 1954, now abandoned which was in turn a division of my application Serial No. 108,773, filed August 5, 1949, now Patent 2,835,885, relating to Electrical Control Apparatus. Details of the operation of the gauging circuits, of which the device constructed in accordance with the principles of the present invention may be a part, are presented in the aforesaid patent and reference may be had thereto to supplement the description hereinafter presented.

Considering first the system of FIG. 1, in general, the illustrative gauging circuits 10, 12 and 14 are connected in parallel with each other and receive electric energy, at a voltage regulated by regulator 16, from a source 18. The source 18 may be of various types, but when the present improvements are used in connection with automotive vehicles, source 18 may, for example, comprise a usual engine driven generator 20 and a battery 22. In line with conventional automotive practice, a voltage regulator VR is interposed between the generator and the battery and, as will be understood, serves to maintain the voltage of the latter between limits which are acceptable for many of the vehicle requirements. In practice, these limits are not close enough for satisfactory operation of desirably simple electric gauges.

The regulator 16 receives the noticeably variable output of the source 18 and delivers pulsating energy to the gauging circuits, the effective voltage of the regulator being substantially independent of variations in the voltage of the source. Under these conditions, it will be appreciated that the individual gauging circuits can utilize simple rheostatic elements 24, 26 and 28 which, in response to liquid level, engine temperature, oil pressure, or other physical condition, serve to vary the resistance of the individual gauge circuits and thereby control the current through, and consequently the positions of, the individual gauges 30, 32 and 34.

As diagrammatically shown in FIG. 1, the regulator 16 comprises a thermally responsive tri-metallic element 40, which carries a heater winding 42. One terminal of winding 42 is grounded as indicated, and the other terminal thereof is electrically connected to the element 40. In this instance the current modulating means comprises a pair of contacts 44 and 46 and a shunt resistor 70. The element 40 carries the movable contact 44, which normally engages the fixed contact 46. Contact 46 in turn is connected to the source 18 through a control switch 48 which may, for example, be controlled concurrently with or be a part of the ignition switch of the associated vehicle.

With this relation, it will be appreciated that closure of switch 48 completes the circuit from the source 18, through contacts 46—44, the body of the element 40 and the heater winding 42 to ground. Completion of this circuit supplies heat to the element 40 and causes its temperature to rise. As is discussed in more detail below, the electrical resistance of the element 40 is so low that for all practical purposes, all of the heating effect can be considered as being derived from the winding 42. With this relation, element 40 can also serve as a conductor of the gauging and heating currents.

Upon being heated, the element 40 warps and separates the contacts 44 and 46, interrupting the just traced circuit and also reducing the heating effect to a value determined by shunt resistor 70. The reduction in heating effect enables the element 40 to cool and restore the contacts 44—46 to closed condition. So long, accordingly, as switch 48 remains closed, contacts 44—46 are periodically opened and closed and the heating current is correspondingly modulated. Consequently, the element 40 acquires a temperature just high enough to hold the contacts 46—46 in a condition of incipient closing and opening. Consequently, neglecting ambient effects, regulator 16 acts to receive from the source 18 an amount of electric energy, in pulsating form, which has a substantially uniform heating value. On this basis, and since, over any period of time, the wattage input to the regulator heater ($E^2/r$) is at a constant rate, it is evident that the regulator 16 breaks up the energy supplied by source 18 into a succession of pulses having an effective voltage which is independent of variations in the voltage of the source 18.

The voltage impressed across winding 42, between terminal 44 and ground is, of course, equal to the voltage impressed upon the individual gauging circuits 10, 12 and 14. These circuits, therefore, are supplied from the source 18 with pulsating energy at an effective voltage which is substantially independent of variations in the voltage of the source 18. Regulator 16 thus effectively serves as a regulator of the voltage impressed across the gauging circuits, and currents drawn by the individual gauging circuits are thus independent of variations in voltage of the source 18.

In the temperature measuring circuit 12, gauge 32 is connected to ground through a resistor 60 having an inverse temperature coefficient of resistance. Various materials are acceptable for this purpose, a class of usable materials being sold under the generic name thermistor. Resistor 60 is, of course, located in a region the temperature of which is to be measured and changes in temperature correspondingly affect the position of the needle of the corresponding gauge 32.

The system of FIG. 2 illustrates certain of the many other variations which can, in the broader aspects of the invention, be made in the basic system of FIG. 1. For example, it is in certain cases desirable to provide an indication, other than that afforded by the visual indicator needles, when certain of the physical conditions being measured reach critical or limiting conditions. More specifically, in connection with liquid level indicators, it may be desirable to provide a supplementary signal when the liquid level in the tank reaches a dangerously low limit.

In FIG. 2, the liquid level unit 24' is like that previously described, with the exception that it is also provided with an insulated terminal 51, disposed to be engaged by the contact 52 when the latter reaches a limiting position, in this case, the low level position. Upon being engaged, terminal 51 completes a circuit for a lamp or other indicator 53, which circuit may lead directly to the battery or may lead through the regulator 16. The direct connection is illustrated in the drawing. As will be obvious, the pressure unit 28 of FIG. 1 may be similarly provided with one or more auxiliary contacts so as to provide for the giving of supplementary indications and these auxiliary contacts may be arranged, as will be understood, at both limits as well as intermediate positions, if desired.

In certain instances, it may be desirable to arrange the system so as to provide that some or all of the indicators will respond to physical conditions existing at different points. For example, in applying the present system to engines of the dual cylinder block type, it may be desirable to arrange the temperature indicator so that it is responsive to temperature conditions in both blocks. In the system of FIG. 2, it is assumed that temperature conditions in the two blocks are, in general, about the same, but that an indication ought to be given if either one of the blocks reaches an undesirably high temperature. Accordingly, in FIG. 2, one of the engine blocks is provided with one of the aforesaid temperature indicating elements 26. The other block is provided with an auxiliary temperature unit 27, which is diagrammatically shown as comprising a bi-metallic element 61 which carries a heater winding 63. The element 61 also carries a movable contact 65 which is normally separated from a grounded fixed contact 67. The unit 27 may, of course, be suitably encased so that it may be introduced into the engine block into contact with the coolant liquid. Under these conditions, element 61 assumes a temperature substantially equal to the temperature of the coolant fluid and warps to a corresponding degree. So long as the temperature of the coolant fluid is below a predetermined critical value, contacts 65—67 remain open and the action of the associated indicator 32 is controlled entirely by the previously described temperature of responsive unit 26. If, however, the temperature in the second block reaches a critical value, contacts 65—67 close and complete a circuit in parallel to that afforded through resistor 60. The resistance of the two circuits in parallel is, of course, less than that of either circuit individually and, consequently, indicator 32 is caused to move to a full scale position, clearly indicating the dangerous condition in the second block.

Proper action of the above described temperature indicating circuit 12', of course, depends upon proper balancing of the resistances of the elements 32—60—63. In a typical case, the resistance of the indicator 32 may be assumed to be approximately 15 ohms and the resistance of element 60 may be assumed to vary between 100 ohms at low temperatures and approximately 10 ohms at the upper end of the scale of indicator 32. The resistance of element 63, on the other hand, may be assumed to be between 15 and 20 ohms. Neglecting the action of the auxiliary temperature unit, the aggregate resistance of elements 32 and 60 under high temperature conditions is 25 ohms. If, under these conditions, the second block reaches a dangerous temperature, the aggregate resistance of the network assumes a value of 21 ohms (assuming a resistance of 15 ohms for element 63), which is sufficiently low to cause the indicator needle 32 to move past the full scale reading position. The network resistance is still high enough, however, so that no undue warping of the indicator 32 is introduced.

Assuming that the blocks operate at somewhat different temperatures and that the second block is at the higher temperature, the resistance 60 will have a value in excess of 10 ohms at the time contacts 65—67 close. Under these conditions, the network resistance will be somewhat in excess of 21 ohms. As before, this will result in a movement of the needle past the full scale position, but not to an undue degree.

In unusual cases, the second block may reach a dangerous temperature at a time when the first block is at a quite safe temperature, corresponding, for example, to a resistance of 50 ohms for resistor 60. Under such conditions, the resistance of the network is approximately 26½ ohms which corresponds to substantially a full scale reading when the element 26 is functioning alone. Thus, by a proper selection of the relative resistance values, proper scale readings can be obtained when element 26 is acting alone; a substantially full scale reading for the second block is afforded even through the first block is at a quite low and safe temperature; and with both blocks at a dangerous condition, a full scale reading but no undue deflection of the indicator 32, is produced when the second block reaches the critical temperature at which contacts 65—67 close. In fact, under each of the just-mentioned conditions, the range of needle movement may be confined to the range customarily marked on automotive temperature indicators as the "danger zone."

A further advantage of the dual temperature indicating arrangement of FIG. 2 is that if a warning signal is produced as a consequence of the action of the auxiliary temperature unit, this warning signal persists until the temperature of the second block has fallen substantially below the temperature which produced the signal. This is for the reason that upon closure of contacts 65—67, winding 63 is supplied with current, and supplies additional heat to bi-metallic element 61. Contacts 65—67, consequently, will remain closed until the temperature of bi-metallic element 61, as influenced both by ambient temperature conditions, and by the heat supplied by winding 63, falls below the critical value.

Referring now to FIGS. 3, 4 and 5, a preferred construction of temperature responsive unit 26 is illustrated. In these figures, the previously identified variable resistor 60 is shown as being of flat circular, disklike form, and is interposed between a pair of lead or equivalent disks 180 and 182, which improve the thermal conductivity of the assembly. Disk 180 directly engages the base of the sleevelike, electrically conductive externally threaded, outer body 184, and thus serves as a grounding connection for one terminal of the resistor 60. The other lead disk 182 directly abuts a brass or equivalent pressure disk 186. Disk 186 has a reduced neck over which one end of a pressure spring 190 is fitted. The other end of spring 190 is fitted over the reduced end 192 of the ungrounded terminal 194. The enlarged flanged body portion 196 of terminal 194, is spaced from the body 184 by an insulator 198. A companion insulator 200 bears against the opposite face of the terminal portion 196, and is held in place by turned in ears 202 formed on the body 184.

The insulator 200 is provided with ears 203 which are received in slotlike spaces between the turned over ears 202 and interlock therewith to prevent relative rotation between the insulator 200 and the body 184. A nonrotative connection between insulator 200 and the terminal 194 is provided by the squared opening 195, and squared boss 197, provided in and on these elements. With this arrangement, it will be appreciated that any rotative forces applied to the terminal 194 when a nut or other element is threaded thereon, for the purpose of connecting a wire thereto, do not cause the terminal to rotate relative to the body 184.

The spring 190 serves not only as an electrical connection between the terminal 194 and the resistor 60, but also protects the resistor 60 during assembly, and prevents the resistor from being subjected to an undue compressive force. It will be appreciated that in manufacture, resistor 60 may, because of manufacturing tolerances, be subjected to slightly different degrees of spring pressure. It is found in practice, however, that the resistor 60 has a resistance characteristic which, throughout a wide range of applied pressures, is substantially uniform. Slight differences in pressure encountered as a consequence of these manufacturing tolerances, accordingly, have no appreciable effect on the resistance of the resistor 60.

It will be appreciated that the electrical circuit through the unit 26, extends from the terminal 194, through the spring 190, and thence through disks 186, 182 and 180, and the variable resistor 60, to the grounded body 184. Body 184 may, of course, be threaded into an aperture provided therefor and which leads into the water jacket of the associated engine.

In order to minimize changes in the temperature of the water jacket, or other body into which the unit is threaded, from influencing the temperature of the resistor 60, as it responds to coolant temperature, the wall portion 184 is of reduced thickness.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a temperature measuring system responsive to temperature conditions at a plurality of points, a plurality of variable resistance elements, said elements being disposable in different temperature environments, an electrical responsive indicator for producing a variable indication in response to variations in the current therethrough, a source of variable voltage, regulating means connected to said source for producing an energizing voltage in the form of a series of pulsations the average value of which remains substantially constant despite variations in the voltage of said source, means connecting said indicator to said regulating means and for connecting said variable resistance elements in parallel with each other with respect to said regulating means, one of said elements including a member the electrical resistivity whereof varies substantially as a function of its temperature and reaches a critical value at a critical temperature, the other of said elements including contact members normally in one electrical relationship and means for changing the electrical relationship between said contact members when the temperature in the region of the corresponding element reaches a critical value, and means including said regulating means and said resistance elements for causing said indicator to produce a preselected critical indication whenever any of said resistance elements reaches its critical value.

2. In a temperature measuring system, a first resistance element the resistance of which varies substantially as a continuous function of its temperature and reaches a critical value upon the application of a preselected level of heat to said first element, a second resistance element the value of resistance of which changes abruptly from a first to a critical value upon the application of a preselected level of heat to said second element and remains at said critical value at any level above said preselected level, said elements being disposable in different temperature environments, a source of variable voltage, regulating means connected to said source for producing an energizing voltage in the form of a series of pulsations the average value of which remains substantially constant despite variations in the voltage of said source, an electrical indicator for producing a variable indication including a critical indication in response to variations in the current therethrough, and means for causing said first resistance element to control the current through said electrical indicator and for causing said electrical indicator to produce said critical indication when either of said elements reaches its critical value comprising circuit means interconnecting said regulating means, said electrical indicator and said first and second resistance elements.

3. The combination of claim 2 in which said electrical indicator produces an increasing indication in response to increases in the current therethrough and produces said critical indication in response to an increase in the current therethrough to a preselected value.

4. The combination of claim 2 in which said first resistance element has a high negative temperature coefficient of resistance and in which said second resistance element comprises a pair of electrical contacts, a polymetallic heat responsive element controlled by said contacts, and heating means in heat transfer relation with said polymetallic element connected in series with said electrical contacts.

5. The combination of claim 3 in which said first and second resistance elements are connected in parallel with one another with respect to said regulating means.

6. In a temperature measuring system, a first resistance element the resistance of which varies substantially as a continuous function of its temperature and which reaches a critical value at a preselected abnormal temperature a second resistance element value of resistance element value of resistance which changes abruptly from a first to a second value upon the application of a preselected level of heat to said second element, said elements being disposable in different temperature environments, an electrical indicator responsive to increasing currents therethrough to provide an increasing indication over a range of values and including a preselected critical value, means including said first element for controlling said indicator to indicate values and for controlling said indicator to indicate said preselected critical value when said first resistance element reaches said critical value in said range of values, and means including said second element effective when said second element assumes its said second value of resistance for causing said indicator to indicate the said preselected critical value.

7. In a temperature measuring system, an indicator for producing a variable indication in response to variations in the current therethrough, first and second resistance elements connected to and controlling said indicator, said elements being disposable in different temperature environments, said first element having a resistance which varies substantially as a function of its temperature, said second element having a resistance which changes abruptly between a first and a second value upon the attainment of a preselected temperature level, and means effective when said second element has changed to said second value for maintaining said second element at said second value of resistance even though the temperature level falls and remains below said preselected level by less than a preselected amount.

8. The combination of claim 7 in which said second element comprises a pair of electrical contacts and a polymetallic heat responsive element controlling said contacts, and in which said means for maintaining said second element at said second value of resistance comprises heating means disposed in heat transfer relation with said polymetallic element and controlled by said electrical contacts.

9. In a temperature measuring system for association with an internal combustion engine having dual cylinder blocks each of which is cooled by circulating coolant and in which the temperature of the coolant adjacent the two blocks tends to be substantially equal under normal conditions but can be dangerously high only adjacent one block under abnormal conditions, the combination of a gauge for indicating coolant temperature, a first temperature sensing element disposed in heat transfer relation with the coolant adjacent one of the blocks, means including said first element and said gauge for producing a continuous indication of the temperature of the coolant adjacent said one block over a range of temperatures including a dangerous temperature, a second temperature sensing element disposed in heat transfer relation with the coolant adjacent the other one of the blocks and having two discrete conditions and changing abruptly from one to the other of said conditions when the temperature of the coolant adjacent said other block reaches said dangerous temperature, means including said second element and said gauge effective only when the temperature of the coolant adjacent said other block reaches said dangerous temperature and only after said second element changes to said other condition for producing an indication of said dangerous temperature independently of the instant temperature of the coolant adjacent said one block, and means effective after said second element has changed to said other condition for maintaining said second element in said second condition until the temperature of the coolant adjacent said second block falls and remains below said dangerous temperature by more than a preselected amount.

10. The combination of claim 9 in which said gauge is controlled by the resistance of said elements, in which said elements are connected in parallel with one another and in series with said gauge, in which said first element changes resistance as a continuous function of temperature over said range of temperatures, and in which said two discrete conditions of said second element are two discrete values of resistance.

11. The combination of claim 10 in which one of said two discrete values of resistance is high relative to the resistance of said first element and in which the other one of said values is a low value greater than zero and within the range of resistance values of said first element.

12. The combination of claim 10 in which said first element includes a resistor having a high temperature co-efficient of resistance, and in which said second element includes a pair of electrical contacts, a polymetallic heat-responsive element controlling said contacts, and a resistance connected in series with said contacts.

13. The combination of claim 12 in which said resistance connected in series with said contacts is a heater disposed in heat transfer relation with said polymetallic element.

References Cited in the file of this patent

UNITED STATES PATENTS

| | | |
|---|---|---|
| 1,858,082 | Foucalt | May 10, 1932 |
| 2,040,217 | Smulski | May 12, 1936 |
| 2,181,960 | Bacon | Dec. 5, 1939 |
| 2,238,071 | Nazar | Apr. 15, 1941 |
| 2,368,289 | Coxon | Jan. 30, 1945 |
| 2,391,992 | Malone | Jan. 1, 1946 |
| 2,407,810 | Boddy | Sept. 17, 1946 |
| 2,452,942 | Lord et al. | Nov. 2, 1948 |
| 2,520,899 | Smulski | Aug. 29, 1950 |
| 2,558,736 | Crews | July 3, 1951 |

FOREIGN PATENTS

| | | |
|---|---|---|
| 480,391 | Great Britain | Feb. 22, 1938 |
| 488,838 | Great Britain | July 14, 1938 |